(12) United States Patent
Ben Ayed (10) Patent No.: US 8,905,303 B1
(45) Date of Patent: Dec. 9, 2014

(54) METHOD FOR ADAPTIVE WIRELESS PAYMENT

(71) Applicant: Mourad Ben Ayed, Cupertino, CA (US)

(72) Inventor: Mourad Ben Ayed, Cupertino, CA (US)

(*) Notice: Subject to any disclaimer, the term of this patent is extended or adjusted under 35 U.S.C. 154(b) by 0 days.

(21) Appl. No.: 14/016,133

(22) Filed: Sep. 1, 2013

(51) Int. Cl.
*G06K 5/00* (2006.01)
*G06Q 20/32* (2012.01)
*G06Q 20/40* (2012.01)

(52) U.S. Cl.
CPC .......... *G06Q 23/325* (2013.01); *G06Q 20/327* (2013.01); *G06Q 23/223* (2013.01); *G06Q 20/40145* (2013.01)
USPC .......................................... 235/380; 235/375

(58) Field of Classification Search
USPC .................................................. 235/375, 380
See application file for complete search history.

(56) References Cited

U.S. PATENT DOCUMENTS

| | | | | |
|---|---|---|---|---|
| 8,045,961 B2 * | 10/2011 | Ayed et al. | ..................... | 455/411 |
| 2009/0221266 A1 * | 9/2009 | Ohta et al. | ..................... | 455/411 |
| 2013/0159119 A1 * | 6/2013 | Henderson et al. | ............. | 705/21 |
| 2013/0166398 A1 * | 6/2013 | Minde | ............................. | 705/16 |

* cited by examiner

*Primary Examiner* — Rafferty Kelly
(74) *Attorney, Agent, or Firm* — Daniel B. Schein

(57) ABSTRACT

A method for facilitating wireless payment using different authentication and connectivity methods depending on the user profile, the user location, transaction, and connectivity capabilities of the payment terminal.

20 Claims, 7 Drawing Sheets

METHOD FOR ADAPTIVE WIRELESS PAYMENT

PRIORITY

The present application is a Continuation-In-Part ("CIP") of pending U.S. patent application Ser. No. 13/954,633, filed Jul. 30, 2013.

FIELD OF THE INVENTION

The present invention relates to systems and methods for payment, and most particularly, adaptive mobile payment using a smart phone.

BACKGROUND

Today, over half of American adults own smart phones and want to use them for shopping: 48% of people use or would like to use a Smartphone to shop while in-store or on the go (Cisco 2013). Within five years, half of today's smart phone users will be using mobile wallets as their preferred payments method. (Carlisle & Gallagher Consulting Group, 2012)

The mobile payment industry suffers from several structural problems and bad user experience:
- Users cannot make purchases without their wallets
- Drivers often struggle to find quarters to pay for parking meters
- Youth can only make cash payments
- Buyers in overseas countries often have to incur large transaction fees in order to receive a wire transfer from a sponsor and make a local purchase
- Plastic card theft and fraud is a major problem Current payment technologies are point solutions that cannot scale to multiple mediums:
- NFC, QR codes and credit cards work well with point of sale (POS) terminals
- Credit cards work well with POS, web/cloud and over the phone payment
- PayPal works well with web
- Square works well with merchant mobile terminal-as-POS
- None of the current payment technologies works with interactive TV, mobile apps or parking meters.

Thus, there is a need for a new wireless point-to-point payment method that enables payment by anybody—youth, overseas people, and adults—to any receiver on any platform—online and off-line.

SUMMARY OF THE INVENTION

A method for adaptive wireless payment comprising:
a first application running onboard a first mobile device obtains a first request to authorize a first transaction via short wireless communication, whereby after the first transaction is approved using the first application, the first mobile device sends a peer-to-peer digital currency corresponding to an amount associated with the first transaction via short wireless communication, wherein the first application can mark the peer-to-peer digital currency as consumed or can delete the peer-to-peer digital currency, wherein the approval encompasses authorization, confirmation, acceptance, permission or agreement, wherein the approval can use an approval method selected from the approval method group consisting of:
a button is activated or a menu is selected or a display is touched, a pass code is authenticated or biometric information is verified, a motion is sensed or a spoken word is detected,
an application is brought to the foreground, and a notification is received wirelessly;
whereby after the first application obtains a second request to authorize a second transaction and after the second transaction is approved using the first application, the first mobile device sends payment information to a remote server via cellular communication,
wherein the payment information is selected from the group consisting of:
peer-to-peer digital currency, credit card information, debit card information, a utility account, a telecom account, an online payment account information, a password, and encryption/decryption keys.

A method for adaptive wireless payment comprising:
a first application running onboard a first mobile device obtains a first request to authorize a first transaction, wherein the first request is obtained from a first remote server via cellular communication;
whereby after the first transaction is approved using the first application,
a first request for approval notification can be sent to a second mobile device,
whereby after the first mobile device receives or obtains a notification of approval via cellular communication, payment information corresponding to the second mobile device is provided,
wherein the payment information is selected from the group consisting of:
peer-to-peer digital currency, credit card information, debit card information, a utility account, a telecom account, an online payment account information, a password, and encryption/decryption keys, wherein the approval encompasses authorization, confirmation, acceptance, permission or agreement.

A method for adaptive wireless payment comprising:
a first application running onboard a first mobile device obtains a first request to authorize a first transaction, wherein the request is obtained via short wireless communication;
whereby after the first transaction is approved using the first application, the first application sends a peer-to-peer digital currency corresponding to the amount of the first transaction to the remote terminal via short wireless communication, wherein the first application marks the peer-to-peer digital currency as consumed or deletes the peer-to-peer digital currency,
wherein the approval encompasses authorization, confirmation, acceptance, permission or agreement; whereby after receiving a receipt or a transaction confirmation, the first application can store or can display the receipt or the transaction confirmation.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

This patent teaches a method for facilitating payment using a smart phone.

This patent teaches using a smart phone application for authentication to any application on any on-line terminal or off-line terminal.

This patent teaches enabling youth or people without access to payment mediums to perform payment though a sponsor.

This patent also teaches adaptive user authentication to reduce fraud and enhance the user experience.

The current invention uses a smart phone application to authenticate the user with multi-factor authentication, and to adapt the authentication to the current location, current transaction, user profile, threat level and policies.

Current location: When a user authorizes a payment transaction from home, the user may not need to enter a PIN. Whereas when the transaction is initiated outside of home, the user may need a PIN.

Current transaction: When a user performs a large amount transaction, the user may be asked to enter biometric information in order to guarantee non-repudiation.

User profile: A young person (or person without credit card) can request a person to sponsor his/her payments. When the person performs a payment transaction, the sponsor is requested to authorize the transaction and to supply a payment method. When the sponsor authorizes the transaction, the person is notified and can complete the transaction with payment processed by the sponsor.

Threat level: When the threat level is high, users may be required to voice authenticate Policies: user authentication is set through a policy console The current invention uses a smart phone application to interface to on-line terminals through cloud, and to interface to off-line terminals through short wireless communication including Bluetooth, RF ID, and NFC . . . . On-line terminals can be a web application, mobile application, interactive TV, point of sale application. Off-line terminals can be a parking meter . . . .

The current invention uses a smart phone application to manage any currency or payment medium including Bitcoin, PayPal account, Square account, credit cards, debit cards, . . . . The user payment currency and/or payment account information is encrypted and stored on the user's smart phone (in a secure memory location such as keychain or secure element), and is not stored in a centralized database. The payment information is provided to authorize merchants, and can only be decrypted using an authorized API (application programming interface). In another preferred embodiment, the payment information is encrypted with PKI, and only approved merchants can read the payment information using a merchant public key. The merchant's key can also be revoked should the merchant loose privileges. The user's private key can also be revoked should the user experience a breach, a loss of smart phone or a theft.

This provides the advantage of no single point-of-failure where a hacker can gain payment accounts for a large number of users. This also provides the advantage of no privacy concerns, and no single entity that knows all your financial information. In a preferred embodiment, the user can back up his/her information to a backup account on his/her personal computer or on a cloud backup service that is independent of the merchant. In another embodiment, payment information can be stored on a central merchant portal.

Figure 1:
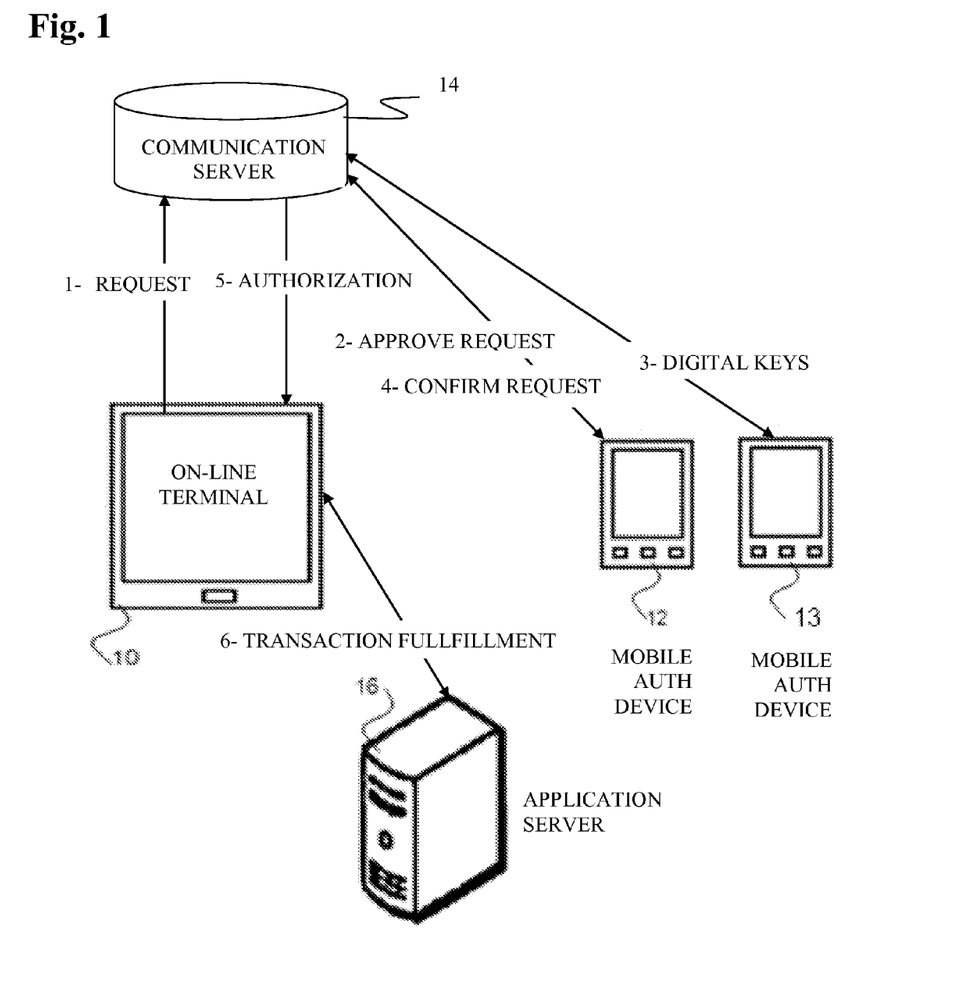
FIG. 1 is a schematic illustrating cloud-based adaptive mobile payment.

Referring to FIG. 1, a cloud-based adaptive mobile payment system using one or two smart phones is described. The system includes an on-line terminal 10, a mobile authentication device 12, a second mobile authentication device 13 distinct from mobile authentication device 12, a communication server 14 and an application/payment server 16.

On-line terminal 10 can be any device including a mobile device, a computing device, a television set, a point of sale terminal, a door entry reader. On-line terminal 10 communicates with communication server 14 and with application/payment server 16 using wireless/cellular data communication or wired communication. On-line terminal 10 runs applications or operations that collaborate with application/payment server 16 to provide merchant services and fulfillment services to the user.

On-line terminal 10 can request payment from application/payment server 16. It needs the user credentials and payment details. The user credentials and payment details are supplied by mobile authentication device 12/13 through communication server 14.

In an alternative embodiment, on-line terminal 10 holds encrypted user information. The encrypted user information can only be decrypted using digitals keys obtained from mobile authentication device 12/13 and through communication server 14. Once decrypted, the user information can be used to execute payment transactions on application/payment server 16.

The invention involves a user initiating a transaction from on-line terminal 10, the user providing authentication from a mobile authentication device 12/13 that are physically separate from on-line terminal 10, and using on-line terminal 10 (and possibly application/payment server 16) for fulfillment.

During the enrollment process, the user must install an application on a smart phone and must log in to an account onboard communication server 14. The sign-up process may include a username/password (possibly for active directory), financial account information and user authentication information such as PIN, password and/or biometrics (voice responses to challenge questions, photos . . . ). The sign up process can also require contact information for the user, e.g., mailing address and email. In another embodiment, the user authentication method is different from a previously used second user authentication method.

During operation, the user or sponsor can give consent to perform a payment transaction with a merchant using the smart phone. If the user is not within a predetermined distance from the merchant, the user may have to go through stricter authentication such as biometrics or two-man-rule. After the user gives consent, the merchant can, without a presentment of the physical payment card, charge (in the case of credit cards) or debit (in the case of debit cards) the user's financial account for items the user wants to buy using a user's payment card or account that is sent encrypted during the transaction and decrypted for the transaction. The user does not need to physically present a credit card to the merchant. In an alternative embodiment, the merchant uses a card that is on file.

The user can sign up using a mobile application or using an online website, and can use the mobile authentication device 12/13, or another computing device such as on-line terminal 10, e.g., a home computer. At some point prior to the transaction, a user authentication application program is downloaded to the user mobile authentication device 12, e.g., through an application store. Mobile authentication device 12 is a smart phone that has a unique identifier. It is connected to the network or internet through 3G or Wifi, and is equipped with an accelerometer, a tilt detector and/or Bluetooth. When the user signs up to the mobile application, the device unique ID is registered with the user's account so as to guarantee that the account it tightly linked to mobile authentication device 12. Data sent to on-line terminal 10 can be encrypted with the device's ID in order to guarantee that only an authorized corresponding device can read data sent from mobile authentication device 12/13.

Communication server 14 can hold the user accounts. It serves as a communication medium between on-line terminal 10 and mobile authentication device 12/13. Communication server 14 can also hold policies that dictate authentication and authorization rules. In a preferred embodiment, data on communication server 14 is encrypted, and communication server 14 does not store any user login or authentication information beyond the time span of the transaction. Immediately after on-line terminal 10 retrieves the user information, the user login or authentication information is deleted. In this embodiment, the user login and authentication information is encrypted and stored on the user on-line terminal 10. This ensures that user login and authentication information is never kept in one place, and is distributed over the user terminals. The advantages is that 1) there is no central repository for the user access and authentication information for multiple applications 2) Each terminal holds encrypted login and authentication information 3) The authentication information cannot be decrypted without physically having mobile authentication device 12 and authenticating to the authentication application 4) Different login and authentication information for different applications are encrypted with different application digital keys stored on mobile authentication device 12/13.

Application/payment server 16 authenticates users and provides payment services. A user must have a user account and must the user information must be authenticated in order to receive payment services.

A normal transaction starts with a user requesting a service using on-line terminal 10. On-line terminal 10 sends a request to communication server 14. Once the user activates the authentication application on mobile authentication device 12/13, it obtains the request from communication server 14, authenticates the user using adaptive authentication, and supplies the digital keys for the transaction. On-line terminal 10 obtains the digital keys for the transaction, and uses them to request authorization from application/payment server 16. Once authorized, application/payment server 16 provides services to the user over on-line terminal 10.

The user account on communication server 14 is paired with at least one smart phone unique identifier. The user cannot log in to the account without a paired smart phone. Pairing is a way of associating or linking a smart phone application to a user account. During registration, a unique identifier for the smart phone is stored in the user account on communication server 14. During subsequent payment operations, the application onboard the smart phone obtains the unique identifier of the smart phone, and uses it to authenticate to the user account on communication server 14.

Figure 2:
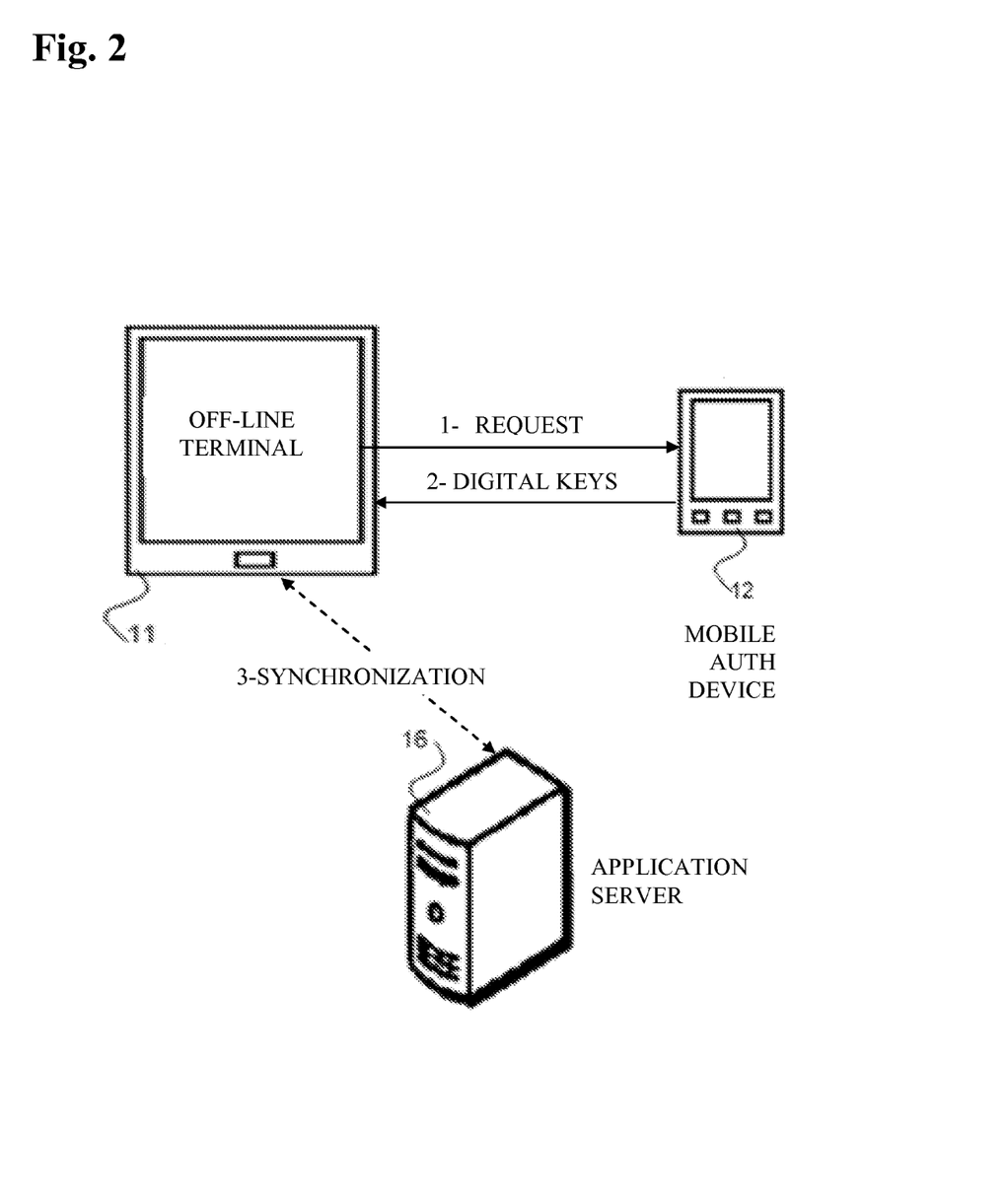
FIG. 2 is a schematic illustrating Bluetooth-based adaptive mobile payment.

Referring to FIG. 2, a Bluetooth-based adaptive mobile payment system is described. The system includes an off-line terminal 11, a mobile authentication device 12, and an application/payment server 16.

Off-line terminal 11 can be any device that is no always connected to the network. For example, this can be a parking meter, a door, a printer, etc.

Off-line terminal 11 can communicate to a central server through a low-bandwidth mesh network or a Zigbee network.

In another embodiment, data from off-line terminal 11 is collected using a USB flash drive.

Figure 3:
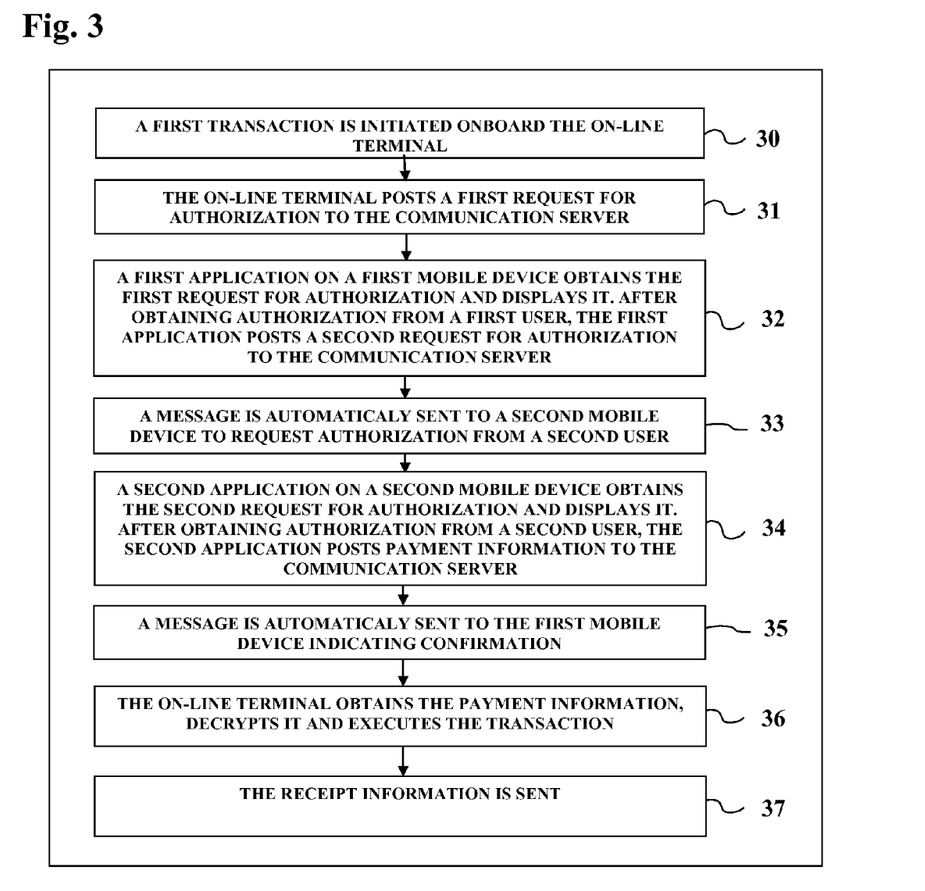
FIG. 3 is a flowchart illustrating cloud-based adaptive mobile payment.

Referring to FIG. 3, a flowchart illustrates a method for cloud-based adaptive mobile payment. In step 30, a first transaction is initiated onboard on-line terminal 10. For example, a user requests to purchase some goods from a web browser, or a user requests to purchase something from an application, or a user requests to purchase something on from an interactive TV set, or a user requests to purchase something from a Point of Sale terminal, etc.

The user can provide a user identifier such as a user name or a phone number. Alternatively, the on-line terminal 10 can scan the user's authentication device id 12/13 wirelessly using Bluetooth or scan a bar code. The user identifier can also be determined automatically through profiling such as a TV set determining who is in the room based on computer vision or other information.

The user transaction can be determined automatically from the current context. For example, if the user is watching a show, and there is a button or icon to purchase an item, the user can click on that button, and the transaction request will be automatically filled. The user may enter a quantity.

The button or icon can also be part of an application onboard the merchant terminal 10. When the application detects that the user moved the application can lock access to the button or icon.

In step 31, on-line terminal 10 posts a request for authentication to communication server 14 corresponding to a user account. The request for authentication can have the transaction details. On-line terminal 10 can also post the required authentication method for the request based on policies corresponding to the transaction risk, location risk, user risk, device risk, time risk . . . , i.e. simple action verification, pass code verification or biometric verification based on context, transaction authorization by a second person . . . . This enables adaptive authentication or stepped up authentication whereby authentication is eased when the user/location/transaction risk is lower, and the authentication is hardened automatically when the user/location/transaction/user risk is higher.

The request for authentication can comprise first transaction information such as the name of the goods, quantity, price, merchant, photo of the good, or any other information. The first application can send a photo of the authorized user to the merchant for authentication. The first application can also send shipping information.

In step 32, the user is logged in to an authentication application onboard a smart phone mobile authentication device 12. The authentication application authenticates the user using the user account onboard communication server 14.

In a preferred embodiment, the authentication application requests user authentication on install or the first time is it run, and after that, it will not request the user to user to authenticate. In another preferred embodiment, the user application requests the user to authenticate every predetermined period of time, where the predetermined period of time is updated using a web-enabled policy dashboard.

The authentication application can obtain policy information from a database or a policy server or a policy dashboard. The policy information indicates threshold, trusted locations, authentication method per location per transaction amount, timeout per location or transaction amount, distance threshold between device and merchant terminal . . . .

The transaction information may be presented to the user onboard authentication device 12 to make sure that the user confirms the correct transaction.

On-line terminal 10 can obtain policy information from a remote server policy database. The policy information indicates conditions for authorization such as:

- Trusted locations defined by areas around a GPS coordinate or a WIFI network or an area near a known RF transmitter
- User authentication rules
- Location authorization rules
- Transaction authorization rules Authentication device 12 obtains sensor information from sensors located onboard the device, such as current location (from a GPS receiver), acceleration (from an accelerometer), gyration, tilt, Wifi networks in view, radio frequency networks in view, radio frequency signal strength, lighting level, audio level, temperature.

The authentication device 12 can post the sensor information to communication server 14. If the sensor information does not match the policy parameters, the authentication device 12 can: abort operation, block response, lock, exist, cloak, cancel the current transaction, and encrypt data.

Upon detection of a user event or activation, the authentication application can fetches the communication server 14 for pending requests for the user. It can determine the current location of the mobile authentication device 12 and send it to communication server 14. If the distance between mobile authentication device 12 and on-line terminal 10 is below a predetermined threshold, then the pending request is processed.

The location of the merchant device is generally static and known. The location of mobile authentication device 12 is determined live using a GPS receiver, WIFI or a location determination system onboard mobile authentication device 12.

If a pending request is found, the authentication application on mobile authentication device 12 displays the transaction details such as merchant name, item name, cost, account, photos etc. The authentication application can send the photo of the authorized user to the merchant for visual authentication. The authentication application can send the shipping information of the user to the merchant.

Authentication device 12 authenticates the user using adaptive authentication:

a button is activated or a menu is selected or a display is touched,
a pass code is authenticated or biometric information is verified,
a motion is sensed or a spoken word is detected,
an application is brought to the foreground,
and a notification is received wirelessly.

It is noted that authorization can mean approval, confirmation, acceptance, permission, agreement or any positive indication, If the user is authenticated, it sends the user digital keys corresponding to the first transaction to communication server 14.

The first mobile device can send a peer-to-peer digital currency corresponding to an amount associated with the transaction via short wireless communication,
and can mark the peer-to-peer digital currency corresponding to an amount associated with the transaction as consumed or can delete the peer-to-peer digital currency corresponding to an amount associated with the transaction.

If the amount of peer-to-peer digital currency corresponding to or contained in the first authentication device 12 is more than an amount of a transaction, the peer-to-peer digital currency corresponding to the amount of the transaction is sent. If the amount of peer-to-peer digital currency is less than the amount of the transaction, a request for approval notification is sent to a second mobile device, and payment if defaulted to the second mobile device. Once the user of the second mobile device approves the transaction, payment information of the second mobile device is used or debited.

The first mobile device can send credit card information, debit card information, a utility account, a telecom account, online payment account information, a password, and encryption/decryption keys.

On-line terminal 10 fetches for the digital keys for the first transaction from communication server 14. On-line terminal 10 uses the digital keys to decrypt the user information (such as username and password . . . ) and uses the decrypted information to login or authenticate to an application on remote application/payment server 16.

In step 33, if the authentication method requires authorization from a second person, a notification is automatically sent to a second person's mobile device. The notification can be an SMS or an in-app notification. The notification requests the second user to authorize the transaction of the first user.

In step 34, when the second user activates an application onboard second mobile authentication device 13, the application displays information about the transaction that the first user started including the transaction details. The second user can accept the transaction. The second user can also assign a payment method for the transaction such as Bitcoin, credit card, PayPal account . . . . In another embodiment, the second application authenticates the second user.

It is noted that during the enrollment/configuration process, the first user can request a second person to be the authorizer for the transactions that the first user performs. After supplying the user name and password of the second user, the account of the first user will be linked to the account of the second user, and transactions of the first user will be automatically sent to the second user for approval and payment fulfillment.

It is noted that during the enrollment process, the first user can make send a request to a second person to sponsor transactions. A message will be sent to the second person, and when confirmed, the account of the first user will be linked to the account of the second user, and transactions of the first user will be automatically sent to the second user for approval and payment fulfillment.

In step 35, after the second person authorizes the transaction by the first person, a notification is sent to the first user.

In step 36, on-line terminal 10 obtains payment information of the second person, decrypts it, and executes the transaction.

In step 37, confirmation/receipt information is sent to mobile authentication device 1 and/or 2.

Figure 4:
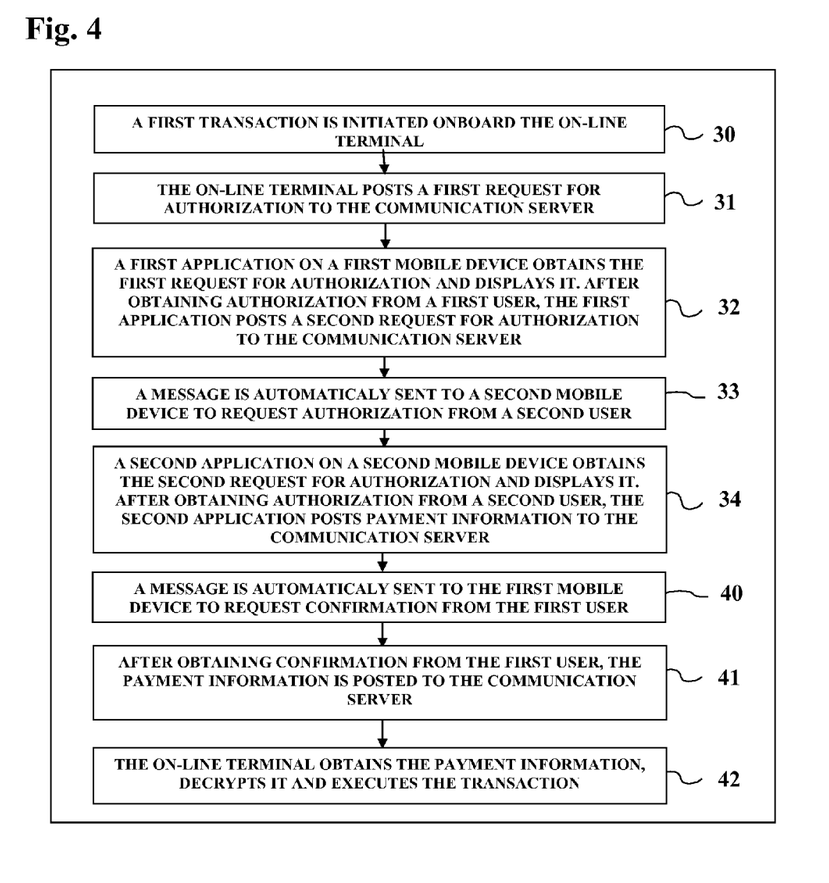
FIG. 4 is a flowchart illustrating an alternative method for cloud-based adaptive mobile payment

Referring to FIG. 4, a flowchart illustrates an alternative method for cloud-based adaptive mobile payment. In step 30, a first transaction is initiated onboard on-line terminal 10. Steps 30 to 34 are described in FIG. 3.

In step 40, after the second person authorizes the transaction by the first person, a notification is sent to the first user to request confirmation from the first user.

In step 41, after the first user confirms the transaction using an application onboard second mobile authentication device 13, the payment information is posted to communication server 14. In step 42, on-line terminal 10 obtains the payment information, decrypts it, and executes the transaction.

Figure 5:
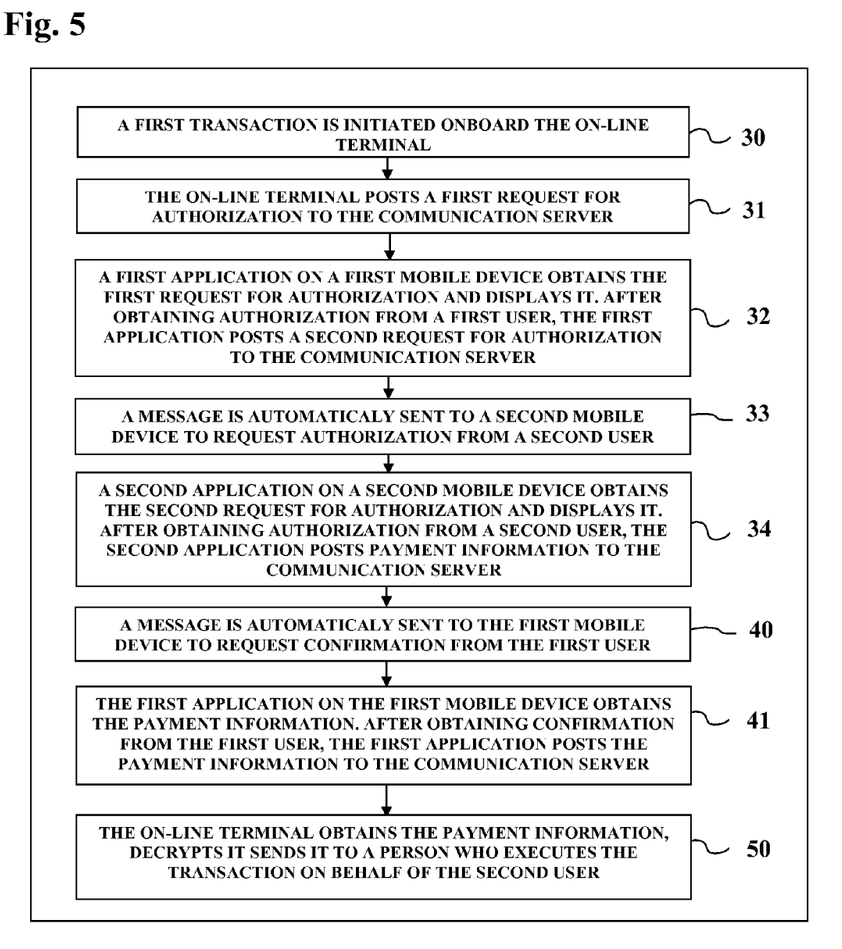
FIG. 5 is a flowchart illustrating an alternative method for cloud-based adaptive mobile payment with manual fulfillment

Referring to FIG. 5, a flowchart illustrates an alternative method for cloud-based adaptive mobile payment with manual fulfillment.

Steps 30 to 34 are described in FIG. 3. Steps 40 to 41 are described in FIG. 4.

In step 50, on-line terminal 10 obtains payment information, decrypts it, and sends it to a person who executes the transaction manually on behalf of the second user.

Figure 6:
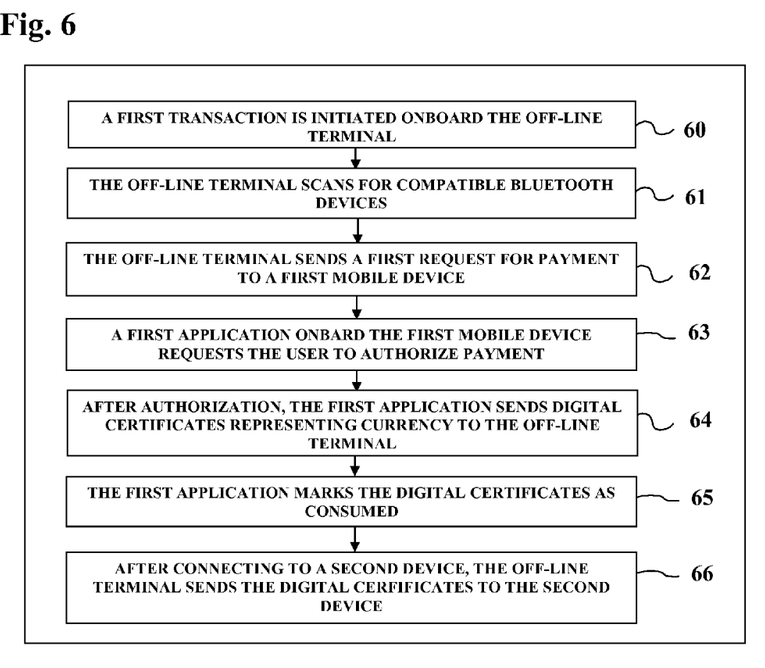
FIG. 6 is a flowchart illustrating Bluetooth-based adaptive mobile payment.

Referring to FIG. 6, the flowchart illustrates a method for Bluetooth-based adaptive mobile payment to an off-line terminal. In step 60, a first transaction is initiated onboard on-line terminal 10. In step 61, off-line terminal 11 scans for compatible Bluetooth devices in proximity using Bluetooth scan or obtain an identifier from a user or scan a bar code or obtain an identifier from memory/database. The off-line terminal can check the found devices against a list of authorized devices or authorization policies, for example, but looking at the device name matches a known list, or the device ID matches a known list or range, or by checking the device has characteristics or properties that correspond to a known list. If more than one device is found to match, the off-line terminal can display a list of found devices. The user can select the correct device, and can enter an authorization code corresponding to the selected device The user can enter the code either on the terminal or from the authorization application. In step 62, off-line terminal 11 sends a first request for payment to mobile devices that are found within proximity. In step 63, a user activates an authorization application onboard mobile authorization device 12. The user can select a payment method. In step 64, the first application sends payment information. Payment information can be any information that can be used to execute payment. For example, a billing account, a charge account, a credit card, a debit card, etc.

When making payment to an off-line terminal, the first application onboard mobile authorization device 12 sends digital certificates representing currency to off-line terminal 11. In a preferred embodiment, peer-to-peer digital currency such as Bitcoin certificates/keys is sent to off-line terminal 11. The digital/Bitcoin certificates/keys are marked as consumed so that they cannot be used for other transactions in step 65. In step 66, off-line terminal 11 can connect to a second device, and can send the collected digital certificates to the second device. In a preferred embodiment, off-line terminal 11 connects to a mesh network. Alternatively, a user inserts a USB flash drive to collect digital certificates from off-line terminal 11.

In another embodiment, if a terminal cannot connect to a network, the authorization application onboard mobile authorization device 12 communicates with the off-line terminal via short wireless communication. If the terminal connects to the network, the authorization application onboard mobile authorization device 12 communicates with the on-line terminal via a remote server via cellular communication. The authorization application polls the remote server to obtain requests, and updates the requests. The online terminal sends requests to the remote server, and polls the remote server to obtain responses.

In another preferred embodiment, the authorization application can communicate with multiple terminals it can communication a first remote terminal via short wireless communication and with a second remote terminal via a remote server and cellular communication. Payment information is sent to the corresponding terminal. The payment information can be decrypted using the public key associated with the authorization application. The public key can be obtained by a merchant through a second system, where the merchant has to authorize to the second system, in order to obtain a public key of a client. This ensures that payment information is encrypted at all times, and that only authorized merchants can access it. After decryption, the payment information is used directly as currency; it can be used to charge an account or to fill a payment form.

In case where payment if fulfilled using a sponsor's account or a second authentication application, payment information corresponding to the sponsor's account or to the second authentication information is sent to the merchant. The merchant obtains the public key associated with the sponsor or with the second authentication application and uses it to decrypt the payment information.

After successful completion of a payment transaction, the authorization application obtains a receipt or a transaction confirmation number or message. It can display the receipt or confirmation information and can store it.

In another embodiment, if motion is sensed or the signal strength of a Bluetooth link falls below a threshold or a Bluetooth link is dropped, payment information is not sent or payment operation is aborted. Motion information is generally information from an accelerometer, a gyro or a tilt sensor located onboard the mobile device. If the motion information is above a threshold can indicate either a violent snatching or theft action. It can also indicate a relay attack whereby a second user is embracing the personality of the first user to make a transaction, generally after a user walks by a hacking spot. With motion detection, since the user is walking, the user cannot be doing a transaction, and therefore, payment operations should not be authorized.

In another embodiment, if the duration from the initiation of the transaction or from the time the transaction was authorized by a second party to the time the transaction is confirmed exceeds a duration threshold, the transaction is cancelled. In another embodiment, the duration threshold is different for trusted locations verses non-trusted locations, and the timeout used for a first transaction in one location is different from the timeout used for a second transaction in a second location.

The timeout duration threshold per location/transaction, authentication policies per location/transaction, user password needed or not per location/transaction can be determined using a policy dashboard/database.

The timeout duration threshold per location/transaction, authentication policies per location/transaction, user password needed or not per location/transaction can be determined using a code received from the merchant request for approval.

The first application can post sensor information to a server and if the sensor information does not match at least one pre-determined policy, the operation is aborted.

In a preferred embodiment, payment information corresponding to the second mobile device is provided after the first transaction is approved using the first authorization application and the first transaction is approved using a second mobile device and the first transaction is confirmed using the first authorization application.

In another preferred embodiment, a first authorization application is linked to a sponsor's account that corresponds to a third application onboard a third mobile device. When a user makes a purchase from a merchant, and the transaction is captured using the merchant terminal, the user approves payment for the transaction using the first authentication application onboard authentication device 12. Once the user approves the transaction using the first authorization application, a notification is sent automatically (and possibly in real-time) to the third mobile device. The notification can be an SMS or an in-app notification. The notification indicated to the second user that the first user is making a purchase, and is requesting sponsorship for payment. The third application can display details of the transaction such as the product name, photo, price, etc.

Once the user of the third mobile device authorizes the transaction, a notification is sent automatically to the first mobile device. The notification indicates that the sponsor has authorized the transaction request, and will pay for it. The user of the first application needs to confirm the transaction before the payment information of the sponsor is transferred to the merchant. This step is important as it ensures that the first user will be ready to collect the goods, and that the merchant knows that the goods are to be delivered to the first user. It is noted that during this operation, the first user never obtains or sees payment information of the second user.

In another embodiment, if the current location of the first mobile device is inside designated geo-locations, the payment information can be withheld. If the current location in inside trusted geo-locations, no password or biometric information, or sponsor approval is requested. The user can be requested to touch a screen, a button, bring an application to the foreground, perform a motion, and say a word. Also, if the current location is outside trusted geo-locations, password or biometric information is requested.

The biometric information can be: voice authentication, voice authentication challenge, handwriting authentication challenge, fingerprint authentication, iris authentication, and facial authentication.

In another embodiment, if the distance between the current location of the authentication device and the location of the merchant is above a threshold, the payment transaction is not authorized.

Figure 7:
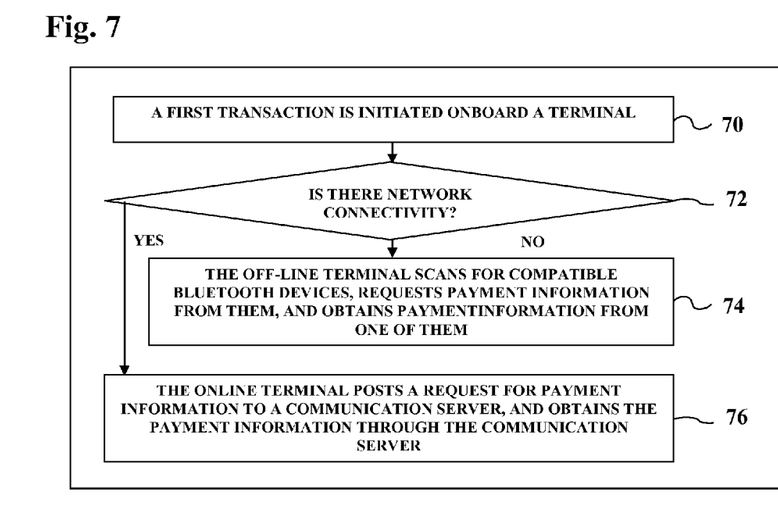
FIG. 7 is a flowchart illustrating adaptive mobile payment.

Referring to FIG. 7, the flowchart illustrates adaptive mobile payment. In step 70, a first transaction is initiated onboard a terminal. In step 72, if the terminal finds network connectivity, the on-line terminal posts a request for payment information to a communication server 14 in step 76. It obtains the payment information through the communication server provided that the user authorizes the transaction using an authentication application onboard mobile authorization device 12. In step 74, if the terminal does not find network connectivity, the off-line terminal 11 scans for compatible Bluetooth devices, and requests payment information from them. Once a user authorizes a transaction using an authorization application onboard mobile authorization device 12, the payment information is transferred through Bluetooth to off-line terminal 11.

In an alternative embodiment, the off-line or on-line terminals are upgraded using object code injection or application wrapping, whereby the injected object code enables connectivity, data encryption/decryption and secure transfer of data (SSL) with the authentication application.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for adaptive wireless payment, comprising:
a first mobile application on a first mobile device obtains a first request to authorize a first transaction from a payment application on a payment device via short wireless communication or via cellular communication,
whereby after the first transaction is approved using the first mobile application on the first mobile device,
a notification message is sent to at least one second mobile device,
wherein after the first transaction is approved using at least one second mobile application on the at least one second mobile device that is different from the first mobile device
and wherein after the first mobile device receives a notification of approval or after the first mobile application obtains approval or acceptance,
payment information corresponding to the second mobile device is provided to the payment application,
wherein the payment information is selected from the group consisting of:
peer-to-peer digital currency, credit card information, debit card information, a utility account, a telecom account, an online payment account, a charge account, a password, and encryption/decryption keys.

2. The method of claim 1, whereby:
the first mobile application communicates with the payment application via short wireless communication or via a remote server.

3. The method of claim 1, whereby:
the first mobile application communicates with the payment application via short wireless communication;
whereby the first mobile application communicates with a second payment application via a remote server;
whereby the first mobile application or the at least one second mobile application sends payment information to the payment application or to the second payment application.

4. The method of claim 1, comprising:
payment information from the at least one second mobile application is sent wirelessly to the payment application.

5. The method of claim 1, comprising:
after the first request to authorize a first transaction is approved using the first mobile application,
a request for approval is sent to the at least one second mobile device,
whereby after the first mobile device receives a notification of approval or after the first transaction is accepted or confirmed using the first mobile application,
payment information is sent to a remote server.

6. The method of claim 1, whereby:
if an amount of peer-to-peer digital currency corresponding to the first mobile device is more than an amount associated with the first transaction,
the peer-to-peer digital currency corresponding to the amount associated with the first transaction is sent;

whereby if the amount of peer-to-peer digital currency corresponding to the first mobile device is less than the amount associated with the first transaction,
    the notification-message is sent to the at least one second mobile device,
    payment information corresponding to the at least one second mobile device is used for payment.

7. The method of claim 1, whereby:
if a digital receipt or confirmation corresponding to the first transaction is obtained, the digital receipt or confirmation is stored or displayed;
whereby if motion or acceleration signals detected onboard the first mobile device are found above a pre-determined threshold or if a Bluetooth signal strength is found below a predetermined second threshold,
    a payment operation is aborted or payment information is not sent.

8. A method for adaptive wireless payment, comprising:
a first application on a first mobile device obtains a first request to authorize a first transaction,
    wherein the first request is obtained from a first remote server via cellular communication or via short wireless communication;
whereby after the first transaction is approved using the first application,
    a first request for approval notification is sent to a second mobile device,
    whereby after the first mobile device receives or obtains a notification of approval via cellular communication,
        payment information corresponding to the second mobile device is provided,
            wherein the payment information is selected from the group consisting of:
                peer-to-peer digital currency, credit card information, debit card information, a utility account, a telecom account, an online payment account, a charge account, a password, and encryption/decryption keys,
                wherein the approval encompasses authorization, confirmation, acceptance, permission, agreement or positive indication.

9. The method of claim 8, whereby:
payment information corresponding to the second mobile device is provided after the first transaction is approved using the first application and the first transaction is approved using the second mobile device and the first transaction is confirmed using the first application.

10. The method of claim 8, whereby:
the payment information is obtained from the first remote server;
whereby the payment information is decrypted using a public key corresponding to the second mobile device;
whereby the decrypted payment information is used to fill a payment form.

11. The method of claim 8, comprising:
the first application is linked to a sponsor account,
    wherein the sponsor account corresponds to a sponsor application on a sponsor mobile device;
whereby after the first application approves a transaction, a notification is sent to the sponsor mobile device.

12. The method of claim 8, comprising:
the first application approves a sponsorship request from a dependent mobile device,
    wherein after the first application receives or obtains a request to authorize a transaction and approves the request,
        a confirmation notification is sent to the dependent mobile device,
        wherein payment information corresponding to the first application is sent wirelessly to a remote device.

13. The method of claim 8, whereby:
if the amount of peer-to-peer digital currency corresponding to the first application is more than the amount associated with the first transaction,
    the peer-to-peer digital currency corresponding to an amount associated with the first transaction is used to pay for the first transaction or to fill a payment form for the first transaction,
        wherein the peer-to-peer digital currency is marked as consumed or deleted.

14. The method of claim 8, whereby:
if motion or acceleration signals are detected above a predetermined threshold or if a Bluetooth signal strength is detected below a predetermined second threshold,
payment information is withheld.

15. The method of claim 14, comprising:
obtaining a first request to authorize a first transaction,
whereby after the first transaction is approved using the first application,
    the first application sends payment information to the second terminal via short wireless communication or cellular communication.

16. The method of claim 8, comprising:
if the current location of the first mobile device is outside of a number of trusted geo-locations or if the amount associated with the first transaction is above a predetermined threshold,
    the approval comprises verifying a pass code or verifying biometric information or obtaining confirmation of approval from a second device.

17. A method for adaptive wireless payment, comprising:
a first mobile application on a first mobile device obtains a first request to authorize a first transaction from a payment application on a payment device via short wireless communication or via cellular communication;
whereby after the first transaction is approved using the first mobile application and the first transaction is approved using at least one second mobile application on at least one second mobile device that is different from the first mobile device,
    payment information corresponding to the second mobile device is provided to the payment application,
        wherein the payment information is selected from the group consisting of:
            peer-to-peer digital currency, credit card information, debit card information, a utility account, a telecom account, an online payment account, a charge account, a password, and encryption/decryption keys.

18. The method of claim 17, comprising:
after the first transaction is approved using the first mobile application,
    a first request for approval notification is sent to the at least one second mobile device,
    whereby after a notification of approval is obtained,
        payment information corresponding to the at least one second mobile device is provided.

19. The method of claim 17, whereby:
if the amount of peer-to-peer digital currency corresponding to the first mobile application is less than the amount associated with the first transaction, payment information corresponding to the at least one second mobile device is used for payment.

20. The method of claim 17, whereby:
if the current location of the first mobile device is outside of a number of trusted geo-locations or if the amount associated with the first transaction is above a predetermined threshold,
the first mobile application authenticates a pass code or biometric information or confirmation of approval from a different device.

\* \* \* \* \*